(No Model.)

A. G. WATERHOUSE.
DYNAMO ELECTRIC MACHINE.

No. 304,384. Patented Sept. 2, 1884.

ATTEST:

INVENTOR:

UNITED STATES PATENT OFFICE.

ADDISON G. WATERHOUSE, OF NEW YORK, N. Y., ASSIGNOR, BY MESNE ASSIGNMENTS, TO THE SCHUYLER ELECTRIC LIGHT COMPANY, OF SAME PLACE.

DYNAMO-ELECTRIC MACHINE.

SPECIFICATION forming part of Letters Patent No. 304,384, dated September 2, 1884.

Application filed February 7, 1883. Renewed February 12, 1884. (No model.)

*To all whom it may concern:*

Be it known that I, ADDISON G. WATERHOUSE, a citizen of the United States, and a resident of New York, in the county of New York and State of New York, have invented certain new and useful Improvements in Dynamo-Electric Machines, of which the following is a specification.

My invention relates to that class of dynamo-electrical machines in which a ring-armature provided with coils of electrical conductors is made to revolve between two magnetic fields; and it more particularly consists of the manner of connecting the armature-conductors and in commutating or taking off the current generated in the same.

In the accompanying drawings, Figure 1 shows the two magnetic fields of force marked S and N, according to their polarity. A indicates in end view a ring-armature provided with coils of electrical conductors marked 1, 5, 2, 6, 3, 7, 4, and 8. The four plates of a commutator are marked $C'$, $C^2$, $C^3$, and $C^4$. In this drawing I have shown the commutator-plates enlarged, to facilitate the following description and the following out of the connections; but in practice they are made small, as shown in dotted circle C around the shaft S', upon which the armature A revolves, and the field-magnets S and N are closed in, so as to closely fit around A and its coils of conductors.

The four brushes $B'$, $B^2$, $B^3$, and $B^4$ are the contact-brushes used in conveying the current to and from the armature. The eight electrical coils on the armature are all of the same size and all wound in the same direction. Said coils are at substantially equal distances apart and occupy substantially the relative position shown in the drawings. In order to explain the method of winding and connecting the several coils together electrically, we will begin with commutator-plate $C'$, to which one free end of the wire composing coil 1 is attached. The inner end, say, of coil 1 is connected to commutator-plate $C'$, and the outer end or terminal of said coil is indicated at $e'$. Here the circuit divides, one portion passing to the inner terminal of coil 5—that is, the terminal of said coil which in passing through the same magnetic field will be of the opposite polarity to the terminal of coil 1, with which it is connected, so that when in the same field the currents in said coils will combine to pass in the same direction; but when in opposite fields the currents of the two bobbins would tend to flow in opposite directions in any circuit in which the other two ends of said coils should be interposed. The other portion of the circuit passes from $e'$ (the outer terminal of coil 1) to the outer terminal of a coil, 7, so that when coils 1 and 7 are in the same magnetic field the currents of coils 1 and 7 would oppose one another in their connecting-wire. The inner terminal of the coil 7 joins the outer terminal of coil 5 at $e^3$, which is the outer terminal of coil 3, and the two circuits combined pass through coil 3 to the commutator-plate $C^3$, connected to the inner terminal of coil 3. The effect of the latter connections, as will be obvious, is that in the circuit between $C^3$ and $C'$ the currents from coils 3 and 7 would flow in the same direction and re-enforce one another when said coils are in the same field, but would oppose one another when said two coils are on opposite sides of the neutral line or line of change of polarity of current in each bobbin—that is, when said bobbins are in opposite magnetic fields. On the other hand the currents from coils 5 and 3 will oppose one another in the circuit between $C'$ and $C^3$ when said coils are in the same field, but will assist when the coils are in opposite fields. The four coils thus connected form a set in which a current flowing between $C'$ and $C^3$ will pass in series through three of said coils, and in multiple arc through the two intermediate coils 5 and 7, and in which there will be a neutralization of effects, as will be presently seen, when coils 1 and 7 are moving in one field and coils 5 and 3 in an opposite field, but in which there will be a flow of currents in the same direction and assisting one another from all the coils, so long as coils 1 7 are moving in one field and coils 5 3 in an opposite field. The second system of coils embraces coils 2, 8, 4, and 6, placed transversely to the first set and commutator-segments $C^2$ $C^4$. Said coils are connected to one another and to the commutator in the same way as the first set—viz., one end of coils 2 and 4 to commutator-segments $C^2$ and $C^4$, respectively, and their other ends each to an opposite terminal of the multiple-arc circuit embracing coils 8 and 6, each in a branch or loop of said circuit. The proper terminals are connected as before, so that there will be an opposition of currents in the system when coils 2 8 are on one side and coils 4 6 on the opposite side of the line passing through the two points at which the polarity of each coil reverses, and which line may theoretically be taken as the line passing midway between the pole-pieces N S, but that the coils will all assist one another when 2 and 6 are in one field and 7 and 8 are in an opposite field.

Figure 3:
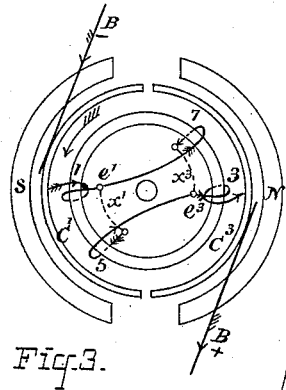
Fig. 3 represents an armature with a single system of coils.

The electrical action of this combination is as follows: Take, for example, Fig. 3, showing one system of four coils provided with two opposite commutator-plates. We will suppose that with the system in the position shown the part of the coils of 1 and 5 that cut the lines of force between the S field and the armature A have a current produced in them that runs toward the observer and away from the drawing, or, in other words, that the outer and inner terminals of said coils, which are connected together, are of opposite polarity, so that they will combine for tension. Then coils 3 and 7, as they pass in the opposite direction between the N field and A, have a current which flows in the outer portion of said coils in the opposite direction, or away from the observer and toward the drawing, so that the currents in said coils may combine for tension, and that the current of coil 7 may work in tension with coil 1. Under these conditions a current passes in a brush, B, to plate C', in and around coil 1 to E', where it divides, one part going across to coil 7, around it, and out at the opposite end to wire X³, to E³, thence around coil 3 to plate C³, and out on brush B˟, while the other part passes through coil 5, and to and through coil 3. In this way we have the electro-motive force of coils 1, 7, and 3 in series in the one path, and the electro-motive force of coils 1, 5, and 3 in series in the other path.

Figure 4:
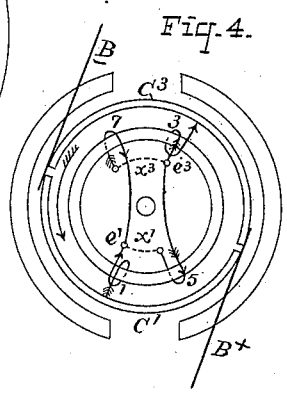
Fig. 4 is another view of Fig. 3, with the position of the coils changed.

In Fig. 4 the same coils are shown in the position about where the brushes are to change plates, and the coils are generating currents which oppose and neutralize one another in the system, and coils 1 and 3 are approaching while 7 and 5 are leaving the line in which their polarity changes, not allowing for the magnetic drag met in practice when the armature is in motion. The coils are then in a position where the brushes can change plates without causing a flash between the brushes and the commutator-plates, although at this time both brushes are in contact with both plates. It will be seen, as before explained, and as indicated by arrows, that the direction of the currents in the several coils is such that they are exactly opposed to each other— that is, 7 opposes 3, 1 opposes 5, 5 opposes 3, and 7 opposes 1.—so that there is practically no current passing between C' and C³, even when the brushes short-circuit them.

It will be observed, in considering the action of the system in Fig. 4, that although the electro-motive force of coils 3 and 1 is opposed by that of 7 and 5, yet as the latter act in multiple arc there would in theory be a resultant electro-motive force of current in the system equivalent to that of either 3 or 1, the currents of which in the position shown would flow in series and assist one another. This can be met by shifting the point of change of the commutator, so that when the brushes shift coils 7 and 5 will be in a portion of the field where they will each generate a current of greater electro-motive force than coil 3 or 1, and will therefore counterbalance or approximately counterbalance the combined electro-motive force of coils 1 and 3 at the point of change. After the armature A has moved slightly around in the direction shown by arrow, coils 3 and 1 reach the neutral line and are inactive, while coils 7 and 5, being in advance, become active and prevent any other active system from short-circuiting through this system without the necessity of cutting out the coils for any considerable length of time, for the reason that if a current attempts to pass through the inactive coils 1 and 3 in the wrong direction it would be opposed by the active coils 5 and 7, through which it would have to pass. After the coils 3 and 1 pass the neutral line, the whole set begins to work together, as in Fig. 3.

Figure 5:
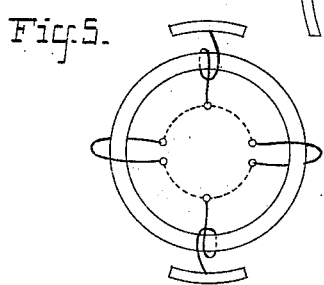
Fig. 5 shows an armature with the four coils of one system placed ninety degrees apart.

I do not confine myself to the exact angle between the coils 1 and 5 or 3 and 7. In this case I have shown forty-five degrees between the lines that form the diameter between 1 and 3 and that between 5 and 7; but the same may be increased to ninety degrees, as indicated in Fig. 5, more or less, if desirable.

Figure 1:
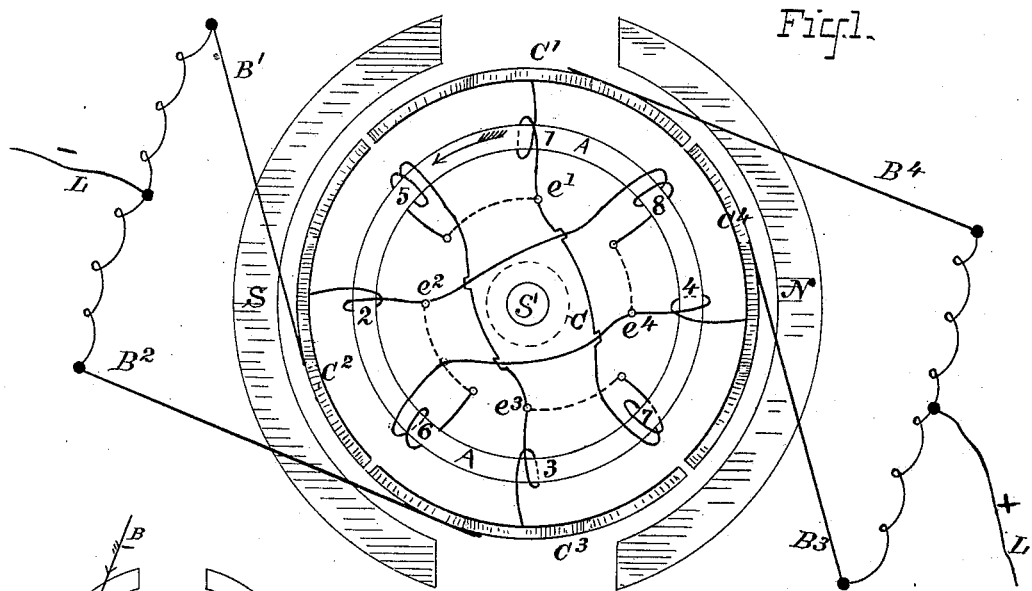

It will be seen by referring to Fig. 1 that the armature A is wound with two systems of coils with two pairs of commutator-plates, one of which includes plates C' and C³ and coils 1, 5, 3, and 7, while the other is composed of plates C² and C⁴ and coils 2, 6, 4, and 8. As shown, these two systems work in multiple arc between the two sets of brushes B' B² and B³ B⁴. The plates are each supposed to be semicircular, with one compound brush on each side or quadrant, as shown, each compound brush consisting of two brushes, to prevent break of circuit as the brush shifts from one segment of the commutator to the next. When the commutator is arranged to take the current in multiple arc from the two sets of bobbins, the overlap of the brushes should be small, to shorten the time during which one set can short-circuit through the cylinder and brush bearing on the same for the other set; or, instead of having one set of brushes for all the systems on the armature A, there may be more, if it is desired. In case great electro-motive force is required, I may employ a separate pair of plates and brushes for each system, as in Figs. 3 and 4, and connect the brushes of each system in series or multiple arc to one another, as the case requires.

Figure 2:
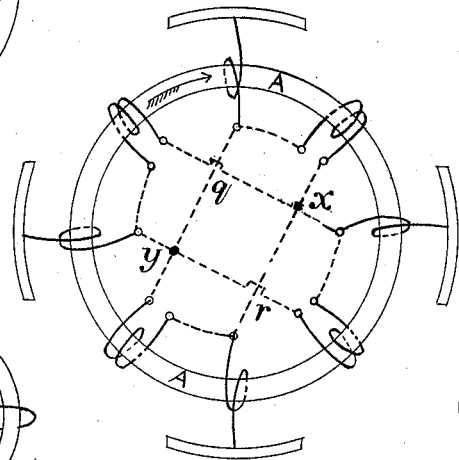
Fig. 2 represents an armature with commutator outside of the field-magnets, with a modification of the electrical connections.

Fig. 2 shows an armature the same as in Fig. 1, to show the possibility of connecting the cross-wires of two systems together, as shown at $x$ and $y$, without interfering with the separate action of each system. As I have stated, I do not confine myself to the angle shown at which the several coils of each system are placed apart, or the number of systems that may be used on the same armature, whether used as a generator or electromotor. Changes may be made in the relative positions of the coils of the two sets; and, if desired, the coils of one set might alternate with the coils of the other set, so that the two sets, instead of being displaced ninety degrees, as shown, would be displaced forty-five degrees.

It is obvious that the method of connecting up and disposing the coils herein described may be applied to other forms of dynamo-electric machines—as, for instance, to the drum or cylinder armature machine—or to that kind of machine in which the coils are wound on separate similarly-disposed bobbins, disposed radially or parallel to the shaft by which they are supported.

In another application for patent filed by me I have described and claimed a method of winding and connection in which the coils are arranged in pairs, and one free end of each pair is connected to the junction-wire of another pair, while its other free end is connected to the commutator. In the present case a coil connected to a commutator-plate and a contiguous coil may be said to be a pair having this method of connection to the other two coils of the set. I, however, make no claim herein, broadly, to such principle, as the principle, if contained herein, is the same as that claimed in my other application aforesaid.

What I claim as my invention is—

1. In a dynamo-electric machine, a ring-armature rotating between two magnetic fields, provided with one or more systems of electrical conductors consisting of four coils, two of which are connected in multiple arc with relation to one another, and in series with the remaining two coils of the set, substantially as and for the purposes set forth.

2. In a dynamo-electrical machine, an armature provided with one or more systems of conductors consisting of four coils in each system, connected as described, so that when said set of coils is in one position in the magnetic field three out of the four will work in series, and the remaining coil will work in multiple arc with one of the three, while when the set is turned ninety degrees the polarities of the coils will be opposed to one another, so as to prevent flash at the commutator when the system is short-circuited thereby.

3. The ring-armature A, provided with electrical coils consisting of one or more systems of four coils, each system consisting of two coils, with a commutator-plate connected to one free end of each, the other end of each of these coils being connected together in two ways, each of which includes one of the remaining two coils belonging to the system, substantially as and for the purpose set forth.

4. The combination, with an armature, of a set of armature-coils, four in number, two of which coils are connected to the two opposite plates of a commutator, and the remaining two are connected in multiple arc between the first two in the manner described, so as to each work in tension with said first two, and commutator-brushes applied in the manner described to change from one segment to the other when the currents in the coils of the system are acting in opposition.

Signed at New York, in the county of New York and State of New York, this 1st day of February, A. D. 1883.

ADDISON G. WATERHOUSE.

Witnesses:
THOS. TOOMEY,
WM. H. BLAIN.